United States Patent Office 3,591,658
Patented July 6, 1971

3,591,658
PRODUCTION OF BUTADIENE-STYRENE GRAFT COPOLYMERS WITH A NICKEL CARBOXYLIC ACID SALT-BORON TRIFLUORIDE ETHERATE-TRIALKYLALUMINUM CATALYST
Akira Onishi, Shiro Anzai, Takao Ishikawa, Akira Koga, Koichi Irako, and Motoki Ishii, Tokyo, Japan, assignors to Bridgestone Tire Company Limited, Tokyo, Japan
No Drawing. Continuation-in-part of abandoned application Ser. No. 474,500, July 23, 1965. This application July 2, 1968, Ser. No. 741,909
Claims priority, application Japan, Apr. 30, 1965, 40/25,215
Int. Cl. C08f *15/04*
U.S. Cl. 260—880      6 Claims

ABSTRACT OF THE DISCLOSURE

A process for manufacturing rubbery or plastic butadiene graft-copolymers having a cis-1,4 content of at least 85% and substantially no gel, which comprises polymerizing butadiene, and copolymerizing styrene at a temperature of from 80° C. to 180° C., with a catalyst system consisting of (A) an organic carboxylic acid salt of nickel, (B) a boron trifluoride etherate and (C) a trialkylaluminum.

---

This application is a continuation-in-part of our copending application Ser. No. 474,500, "Production of Butadiene-Styrene Copolymers With a Nickel Carboxylic Acid Salt-Boron Trifluoride Etherate-Trialkylaluminum Catalyst" filed July 23, 1965, and now abandoned.

This invention relates to a process for preparing butadiene-styrene or -α-alkylstyrene graft copolymers having a high content of cis-1,4-butadiene, utilizing a catalyst system consisting of (A) an organic carboxylic acid salt of nickel, (B) a boron trifluoride etherate and (C) a trialkylaluminum.

The principal object of the invention is to provide a novel, unobvious and highly useful catalyst system for the preparation of a butadiene graft copolymer having a high content of cis-1,4-configuration from butadiene and styrene or α-alkylstyrene.

Another object is to provide a useful low pressure process for obtaining a butadiene graft copolymer, wherein butadiene is substantially completely polymerized in the presence of the above three component catalyst and graft-copolymerized with styrene or α-alkylstyrene at a temperature of 80° C. to 180° C.

Recently, in order to improve rubbers, plastics or fibers or to provide novel copolymers, many studies for grafting various monomers to these rubbers, plastics and fibers have been made. For example, various attempts have been made in order to retain the advantages of cis-1,4-polybutadiene and improve the difficulties. Among them, if a graft copolymer copolymerized vinyl substituted aromatic hydrocarbon monomer to cis-1,4-polybutadiene is obtained, characteristic physical properties are expected.

However, it has been known that in general, when a polymer is grafted with the other monomer, the polymer in the solution or a dispersion in a solvent is added with a radical type catalyst or irradiated with radiation, light and the like the graft efficiency of the resulting polymer is less than 50%, usually less than 30% and gelation is liable to be caused and undesirable results are brought about.

Recently, it has been reported that a useful high impact resin is obtained by grafting styrene to cis-1,4-polybutadiene produced by means of catalyst prepared from an organometallic compound and an iodine-containing compound by adding a radical catalyst (Japanese patent application publication No. 6,917/66). This catalyst for cis-1,4-polybutadiene has no polymerization activity for styrene and styrene acts only as a solvent. Accordingly, if in order to promote the polymerization of styrene, the co-polymerization is effected by adding a radical type catalyst, for example, a peroxide catalyst (this catalyst has a function for inactivating the cis-1,4-polybutadiene catalyst), the resulting polymer consists of a mixture of polybutadiene-styrene graft polymer, homopolybutadiene and homopolystyrene.

The inventors have found unexpectedly that when butadiene is substantially completely polymerized by means of a nickel base three component catalyst and styrene or α-alkylstyrene is added and copolymerized thereto at an increased temperature, high cis-1,4-butadiene graft copolymers having substantially no gel can be easily synthesized in a high graft efficiency.

The process of the invention is essentially different from the above described graft processes and has the following advantageous features.

(1) The catalyst for cis-1,4-butadiene-graft copolymers of this invention consists of three-components, all or two of which are soluble in organic solvents, and the soluble catalyst is prepared simply, has high activity for copolymerization and affords reproducible results.

After polymerization, the catalyst of the present invention can be readily separated from the polymer by washing with alcohol, but the separation may be omitted because the catalyst is usually used in a small quantity and becomes harmless after being made inactive with alcohol, alcohol-ketone or the like.

(2) Butadiene graft copolymers produced by the process of this invention have high cis-1,4-contents in the butadiene configuration and substantially no gel. According to this invention, graft copolymers having a cis-1,4-content of at least 85% and substantially no gel are stably obtained without being affected by the three components ratio, catalyst preparation methods and copolymerization conditions.

This is one of the important characteristics of the catalyst of this invention.

(3) The present process gives graft copolymers having a high graft efficiency.

The graft efficiency to be used as an indication of graft copolymer is defined as follows:

$$\{(S_T - S_H)/S_T\} \times 100$$

In the above formula, $S_T$ is the total amount of styrene or α-alkylstyrene polymerised and $S_H$ is the amount of homopolystyrene or homopoly-α-alkylstyrene.

It is considered that the copolymers of the present invention are graft copolymers, wherein the main chain is composed of high cis-1,4-polybutadiene and the side chain is composed of polystyrene, poly-α-alkylstyrene or a linking chain consisting mainly of said polymer.

The reason is based on the fact that (1) the production of the copolymers is two stage process and (2) as shown in Example 1 for producing the copolymer having a high long chain ratio, the number of linking chain of polystyrene or poly-α-alkylstyrene copolymerized to one molecule of cis-1,4-polybutadiene is more than 1 in average.

The copolymerization reaction of the present invention comprises the first stage for polymerizing butadiene into cis-1,4-polybutadiene and the second stage for copolymerizing styrene or α-alkylstyrene. In general, styrene or α-alkylstyrene undergoes thermal polymerization at a temperature of higher than 50° C., particularly, higher than 100° C. to form the homopolymer, so that it has been considered that a temperature of higher than 100° C. is not preferable in the copolymerization in order to improve the activity, because the graft efficiency is decreased.

However, it has been found that in the present process using the catalyst according to the invention, the copolymerization activity can be considerably increased by effecting the copolymerization in the second stage at a temperature of 80° C. to 180° C., particularly, 100° C. to 160° C. and further that unexpectedly the graft efficiency is not decreased and rather is more improved than in case of a low polymerization temperature and the formation of gel does not substantially occur. It has been well known that the physical properties of the copolymer in a high graft efficiency are superior to those of a blend of polybutadiene with homopolymer of styrene or α-alkylstyrene.

(4) Other advantage of the present invention is that it is possible to adjust a length of linking chain of styrene or α-alkylstyrene to be grafted to polybutadiene. It is an important factor that the length of linking chain of styrene or α-alkylstyrene gives various characteristics to the physical properties.

(5) It is the other large advantage that the graft copolymers of the present invention have a lower solution viscosity than cis-polybutadiene and on the other hand, particularly, in a long chain ratio, the graft copolymers show a high Mooney viscosity. For example, the graft copolymer having a high graft efficiency (more than 90% obtained by copolymerizing styrene to a cis-1,4-polybutadiene having an intrinsic viscosity of 3.58 in toluene at 30° C. and a Mooney viscosity of 63.5 at 100° C. contains 13.0% of styrene and shows an intrinsic viscosity of 3.26 and a Mooney viscosity of 125.0. These behaviors of the solution viscosity and the solid viscosity are very interesting and the resulting graft copolymers are very compatible with various oils by various means as in conventional rubbers or plastics and inexpensive oil extended graft copolymers can be easily obtained.

(6) This invention also relates to copolymers which have better heat aging properties and higher hardness than those of cis-1,4-polybutadiene with an identical modulus level.

Therefore, these copolymers are effective in improving the cornering force of tires by increasing the hardness of the tire stock without diminishing cut growth resistance with respect to groove crack resistance of tires.

In the present invention, the comonomer to be used in the second stage is a substance selected from the group consisting of styrene and α-alkylstyrene, and preferably styrene. Examples of α-alkylstyrene compounds which can be advantageously utilized include α-methylstyrene, α-ethylstyrene, α-propylstyrene and the like.

The A-component of the catalyst of this invention is an organic carboxylic acid salt of nickel and having the formula

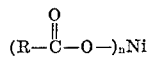

(wherein R is a hydrocarbon radical having from 1 to 20 carbon atoms and $n$ is the valence of nickel) and they are classified as follows: a nickel salt of aliphatic-, alicyclic-, aromatic-, carboxylic acids, for example, nickel formate, nickel acetate, nickel 2-ethylhexoate, nickel palmitate, nickel isooctenate, nickel stearate, nickel oxalate, nickel naphthenate, nickel benzoate, and the like. It is preferred to use nickel 2-ethylhexoate, nickel palmitate, nickel isooctenate, nickel stearate, nickel naphthenate, nickel benzoate.

The B-component of the catalyst used for the process of the invention is boron trifluoride etherate, preferably boron trifluoride ethyletherate.

The C-component of the catalyst to be used in the process of the present invention is a trialkylaluminum, wherein alkyl group contains from 1 to 6, preferably 2 to 4 carbon atoms, for example, triethylaluminum, tributylaluminum, triisobutylaluminum. It is preferred to employ triethylaluminum or triisobutylaluminum.

These three components of the catalyst have the same indispensable functions for cis-1,4-butadiene-graft copolymerization.

By selecting each component from the preferable compound above described and combining them, preferable three-component catalysts can be obtained such as; nickel naphthenate-boron trifluoride etherate-triethylaluminum or triisobutylaluminum, nickel 2-ethylhexoate-boron trifluoride etherate-triethylaluminum or triisobutylaluminum, nickel isooctenate-boron trifluoride etherate-triethylaluminum or triisobutylaluminum, nickel stearate-boron trifluoride etherate-triethylaluminum or triisobutylaluminum, nickel benzoate-boron trifluoride etherate-triethylaluminum or triisobutylaluminum.

The catalyst is usually soluble or, in certain cases, corpuscular in organic solvents. Said catalyst system is generally prepared by mixing the three components in an inert atmosphere and in a suitable diluent.

When the three-component catalysts are prepared by mixing the A, B and C components, the mixture ratio and the mixing temperature of these components, and other various factors influence the copolymerization. Among these conditions, the mixture ratio is an important factor. The mole ratio of the A-component to the C-component is usually within the range of about 0.005 to about 4.0, but is preferably in the range of about 0.01 to about 1.0. The mole ratio of the C-component to the B-component is usually within the range of about 0.1 to about 5.0, and preferably within the range of about 0.3 to about 2.0.

The catalyst system is prepared by admixing said three components in an anhydrous liquid hydrocarbon diluent generally at a temperature between about −50° C. and about 80° C., preferably about −5° C. and about 40 C. If it is necessary to modify the catalytic function of said catalyst system, aging or heat-treating of the system may be subsequently carried out.

When the catalyst of the invention is stored at room temperature, the activity thereof remains constant and unchanged over long periods of time.

The amount of catalyst employed is not especially critical in the invention, but its amount used is usually less than 10 mol percent of total monomers charged.

It is desirable not to bring water, oxygen and the like into contact with the catalyst, but the effect of these materials on the graft copolymerization activity and cis-1,4-orientating activity of the catalyst system is not so sensitive as that of Ziegler-type of Li-type catalyst, accordingly, it is to be understood that some of these materials can remain in the reaction imixture.

In an embodiment for the preparation of these copolymers, thes polymerization of butadiene is effected, after which styrene or α-alkylstyrene is charged to the polymerization zone. In the present invention, the contacting of the butadiene with the catalyst system is effected at a temperature within the range of −30 C. to 150° C., preferably 0° C. to 100° C., and styrene or α-alkylstyrene is added to the polymerization zone and copolymerized at a temperature within the range of 80 C. to 180° C., preferably 100° C. to 160° C., in liquid phase, under a pressure sufficient to maintain the reaction system in liquid phase and under an inert atmosphere.

If the copolymerization is effected at a temperature of higher than 200 C., the graft efficiency decreases and gel is formed, so that such a temperature is not preferable.

Butadiene polymerizes at a very satisfactory rate in the presence of the catalyst of this invention whereas styrene or α-alkylstyrene polymerizes slowly in comparison with the butadiene, but, upon increasing the polymerization temperature as hereinbefore specified, the activity of the styrene or α-alkylstyrene polymerization is considerably improved and the graft efficiency of the copolymer is very high.

In the production of the graft copolymers, butadiene is polymerized in the first stage in the presence of the catalyst system of the invention and in this case, by adjusting the amount of butadiene in the reaction system after the first stage, the length of linking chain of styrene or α-alkylstyrene in the resulting graft copolymers can be adjusted as mentioned hereinafter. The adjustment of the amount of butadiene can be carried out by varying polymerization conversion ratio of butadiene, removing unreacted butadiene partially or completely or adding butadiene.

Copolymerization is effected by using butadiene and styrene or α-alkylstyrene substantially free of catalyst poisons.

The process of this invention is carried out in the presence of a hydrocarbon diluent. Aromatic hydrocarbons, paraffins and cycloparaffins are applicable. The preferred hydrocarbons of these types are those containing from 3 to 12 carbon atoms. Examples of diluents which can be used include propane, isobutane, n-pentane, n-hexane, n-heptane, benzine, isooctane, n-dodecane, cyclopentane, cyclohexane, methylcyclohexane, benzene, toluene, xylene, and the like. Mixtures of two or more of these hydrocarbons can be used if desired.

Purification of diluents can be carried out by generally known methods.

The copolymers have high contents of cis-1,4-configuration of at least 85%, usually 90 to 98%.

The intrinsic viscosity of the graft copolymers after the two stage copolymerization is lower than that of usual polybutadiene, so that the stirring can be effected conveniently, the heat is easily diffused, the polymerization can be effected in a high concentration and at the same time the solid viscosity becomes larger and if necessary, the copolymer having Mooney viscosity of more than 100 can be easily obtained.

Among the structure of the graft copolymer, the length of linking chain of styrene or α-alkylstyrene gives various characteristics to the physical properties, so that it is a very important factor. The length of the linking chain can be determined by the oxidation decomposition process by means of a peroxide in the presence of osmium tetraoxide catalyst. Namely, when the graft copolymer of the present invention is subjected to an oxidation decomposition, only the linking chain of butadiene is completely decomposed and the linking chain of styrene or α-alkylstyrene remains in undecomposed state and when methanol is added thereto, the remaining chain having a polymerization degree of less than about 5 is soluble in methanol and the remaining chain having a polymerization degree of more than about 5 is insoluble in methanol. The molecular weight of the methanol insoluble linking chain can be determined by a conventional process. The ratio of the methanol insoluble linking chain shows the long chain ratio. Namely, the long chain ratio can be shown by the following formula.

$$\frac{S_R - S_H}{S_T - S_H} \times 100$$

In the above formula, $S_T$: the total amount of styrene or α-alkylstyrene polymerized.

$S_H$: the amount of styrene or α-alkylstyrene polymer which has not been copolymerized, that is, homopolystyrene or homopoly-α-alkylstyrene (as mentioned above, it is a characteristic in the present invention that $S_H$ is small).

$S_R$: the amount of long chain styrene or α-alkyl-styrene polymer obtained as methanol insoluble portion after the oxidation of the graft copolymer.

As to the relation of this long chain ratio to the physical properties, for example, the graft copolymer having a high long chain ratio is very larger in an increasing ratio of Mooney viscosity than the graft copolymer having a medium or low chain ratio and the vulcanized product of this graft copolymer is excellent in tensile strength, heat resistance, blow-out and on the other hand, the vulcanized product of the copolymer having a low long chain ratio is excellent in abrasion resistance, cut-gross, resilience and tear strength. As seen from this fact, the graft copolymers of the invention show individual characteristic according to the difference of the long chain ratio.

The adjustment of long chain ratio of styrene or α-alkylstyrene in the graft polymer of the invention can be easily effected by controlling an amount of butadiene in the reaction system. When the amount of butadiene in the second stage is suppressed to less than 5% of the amount of butadiene fed, the long chain ratio of the graft copolymer is more than 60%, usually, more than 80%. On the other hand, as the amount of butadiene in the reaction system of the second stage is larger, the long chain ratio decreases and the long chain ratio varies according to the polymerization condition, but when the amount of butadiene in the second stage is usually more than 30% of the amount of butadiene fed, the long chain ratio is less than 20%.

The graft efficiency of styrene or α-alkylstyrene is more than 70% and usually 80–100%.

According to the invention, microstructures of the butadiene units and the content of the styrene or α-alkylstyrene in the copolymers were determined according to infrared spectroscopic analysis. Intrinsic viscosities were determined in toluene at 30° C. Gel contents of these copolymers were measured by filtering their solution in benzene with 200 mesh wire gauze, and were substantially zero in the copolymers obtained via the catalyst system of the invention.

The separation of catalyst from the copolymer can be done by the following simple manner which is a characteristic of the present catalyst.

After the completion of the reaction, if necessary, a solvent containing a small percentage of phenyl-β-naphthylamine is added to dissolve the copolymer completely or to lower the viscosity of the reaction mixture, and the mixture is poured into a large quantity of non-solvent, such as methanol, isopropylalcohol, or methanol-acetone to precipitate the copolymer. For example, the copolymer prepared with a three-component catalyst consisting of nickel 2-ethylhexoate, boron trifluoride etherate and triethylaluminum displays a brown color because of the remaining catalyst, but it changes to a white copolymer gradually by washing several times with methanol.

Because the catalyst of this invention is highly active, the synthesis of cis-1,4-butadiene-graft copolymers can be effected with a very small quantity thereof. As the catalyst is soluble in suitable diluents which do not dissolve the polymer, such as alcohol, acetone and the like, the catalyst is separated very easily from the polymer by washing with the above mentioned diluents. When pure a polymer is not necessary, it can be used without especially eliminating the catalyst because its content is very small and it is harmless.

The graft copolymers of the invention have wide properties from rubbery state to resinous state only by changing the composition of monomer units contained in the graft copolymer and can be applied to various uses. For example, when the graft copolymer having a styrene content of 5 to 30% is used for tire rubber, such graft copolymer can provide tire by the same compounding, vulcanization and molding as used in conventional natural rubber and this tire has characteristic properties in heat resistance, abrasion resistance, skid resistance and the like. As the other example, a high styrene copolymer can be easily molded by a conventional working process for plastics and has a high utility as high impact resin.

The following examples are given to illustrate a preferred method of operating according to the invention.

EXAMPLE 1

A 100 l. stainless steel autoclave equipped with a mechanical stirrer was dried thoroughly and purged with nitrogen three times. Then, into the autoclave were added 40.12 kg. of dried toluene, and then 30.94 mmol of nickel naphthenate and 103.13 mmol of boron trifluoride etherate were added thereto. After 10 minutes, 103.13 mmol of triethylaluminum were added thereto and the resulting mixture was reacted for further 10 minutes to prepare a catalyst.

All the above mentioned treatments were effected at 20° C. while stirring.

The catalyst system was cooled to −50° C. and added with 185.4 mol (10.03 kg.) of butadiene and the polymerization was effected at 40° C. for 5.5 hours and further at 80° C. for 1.5 hours. The conversion of butadiene at this stage was 99.6%. The resulting polybutadiene had an intrinsic viscosity (the intrinsic viscosity was measured in toluene at 30° C. hereinafter) of 3.14 and a Mooney viscosity of 48.0 at 100° C.

Then 123.6 mol (12.87 kg.) of styrene were added to the reaction system and the temperature was raised to 140° C. and the copolymerization was effected for 2.5 hours, after which the reaction was stopped by adding acetone containing 2,6-di-tert-butyl-p-cresol. The reaction product was taken out from the autoclave, and after the solvent was removed by steam stripping method, the product was dried at 50° C. under vacuum. The obtained product was a strong rubbery elastic copolymer. By infrared analysis, the styrene content was 17.5%, cis-1,4 bond 97.4%, trans-1,4 bond 1.5% and vinyl-bond 1.1%. The intrinsic viscosity was 3.02, the Mooney viscosity 123.5 at 100° C. and there was no gel. It was apparent from the following three reasons that the reaction product was a graft copolymer.

(1) A two-stage copolymerization reaction is adopted.

(2) When styrene is added and copolymerized with polybutadiene in such a state that there is substantially no butadiene monomer in the reaction system, and the number of polystyrene chains copolymerized with one molecule of polybutadiene is larger than 1 in average.

(3) Butadiene unit and styrene unit are bonded chemically.

The reason (3) was verified by the two phase-fraction extraction method using n-hexane and N,N'-dimethylformamide (hereinafter abridged as DMF), by which the homopolymers can be separated quantitatively from the mixture.

Namely, 1 g. of the reaction product is dissolved in 200 ml. of n-hexane and the resulting solution is put into a separating funnel. Then, 100 ml. of DMF are added thereto, shaken and left to stand. The resulting solution is separated into two layers, and homopolystyrene is dissolved selectively in the lower DMF layer. 100 ml. of fresh DMF are added to the upper hexane layer and further extraction and separation are effected. The first and the second DMF layers are combined and DMF is removed by drying under vacuum and the resulting homopolystyrene is weighed.

Thus, the graft efficiency defined in the specification can be determined.

On the other hand, it has been confirmed that the blend of polybutadiene with polystyrene can be separated completely into each homopolymer by the above mentioned process (i.e. the graft efficiency is 0).

The reason (2) was verified by cutting the double bond of polybutadiene in the main chain by oxidation decomposition after confirmed the high graft efficiency, recovering the side chain of styrene polymer and determining the molecular weight.

The oxidation decomposition was carried out according to the method disclosed by I. M. Kolthoff et al. (J. Polymer Sci., 1, 429 (1946)), in which osmium tetraoxide and tert-butylhydroxy peroxide are used, and it was effected after it was confirmed that polybutadiene was decomposed completely and polystyrene was not decomposed. After the decomposition, the long chain ratio as defined in the specification was calculated.

The reaction product in Example 1 had a graft efficiency of 95.0% and a long chain ratio of 94.1%. Furthermore, the polybutadiene in the main chain and the polystyrene in the side chain of the reaction product had average molecular weight of 342,000 and 17,800 respectively, and the reaction product contained 17.3% by weight of styrene, so that it was found that four polystyrene side chains are bonded to one polybutadiene main chain in average.

COMPARATIVE EXAMPLE 1

In toluene, butadiene was polymerized at 40° C. for 2 hours in a mole ratio of nickel naphthenate: boron trifluoride etherate:triethylaluminum=0.1:1.0:1.0, at a catalyst concentration of 8.0 mmol/l. and at a monomer concentration of 2.6 mol/l. to obtain polybutadiene. The resulting polybutadiene was added with a large amount of methanol and the catalyst was inactivated and dried under vacuum. 8.60 g. (0.159 mol) of the dried polybutadiene were dissolved in 86.0 g. of dried toluene, then 0.159 mol of styrene was added thereto and the copolymerization reaction was effected at 140° C. for 5 hours.

The reaction product was a resinous elastic copolymer and contained 51.6% of styrene and the graft efficiency was 62.0%.

COMPARATIVE EXAMPLE 2

In a 300 ml. stainless steel autoclave equipped with a stirrer were charged 125 ml. of toluene, 0.093 mmol of nickel naphthenate, 0.93 mmol of boron trifluoride etherate and 0.93 mmol of triethylaluminum and a catalyst was prepared in the same manner as described in Example 1. Then 0.5 mol of butadiene was added to the catalyst system, and polymerized at 40° C. for 2 hours. Then 0.33 mol of styrene was added to the system and copolymerized at 200° C. for 5 hours while stirring to obtain 41.0 g. of the reaction product. The reaction product contained 43.4% of styrene and 41.1% of gel, and the graft efficiency was 44.5%.

EXAMPLE 2

In a 25 l. stainless steel autoclave equipped with a stirrer were charged 7.572 kg. of a mixed solvent of hexane and toluene of 1:1 and then nickel naphthenate, boron trifluoride etherate and triethylaluminum were added thereto to prepare a actalyst in the same manner as described in Example 1. 35.0 mol of butadiene were added to the catalyst system and polymerized at 40° C. for 3 hours. The above mentioned catalyst had a composition of Ni:B:Al=0.1:1.0:1.0, and the catalyst concentration was 6 mmol/l. The resulting polybutadiene had an intrinsic viscosity of 4.30. Then 35.0 mol of styrene were added to the system and reacted at 100° C. for 7 hours while stirring. The reaction was stopped and the reaction product was dried and analyzed in the same manner as described in Example 1. The styrene content was 7.3%, cis-1,4-bond 93.9%, trans-1,4-bond 4.2% and vinyl-bond 1.9%, and the intrinsic viscosity was 3.25 and the graft efficiency was 83.6%.

EXAMPLE 3

In a 300 ml. autoclave were charged 62.2 ml. of toluene, 0.128 mmol of nickel naphthenate, 0.425 mmol of boron trifluoride etherate and 0.425 mmol of triethylaluminum and the catalyst was prepared in the same manner as described in Example 1. The resulting catalyst system was added with 0.25 mol of butadiene and the polymerization was effected at 80° C. for 4 hours, after which 0.25 mol of styrene was added thereto and stirred thoroughly and then the copolymerization was effected at 160° C. for 3 hours. The resulting rubbery elastic copolymer had a styrene content of 38.0%, and cis-1,4 bond of 92.8%, trans-1,4 bond of 4.4% and vinyl bond of 2.8%. The intrinsic viscosity was 1.83, the graft efficiency was 98.2% and the long chain ratio was 100%.

EXAMPLES 4–7

In the same manner as described in Example 1, catalysts were prepared from nickel naphthenate, boron trifluoride etherate and triethylaluminum in a ratio of $$Ni:BF_3:Al = 0.3:1.0:1.0$$

in a 100 l. autoclave, and the polymerization reactions were effected and the variation of the long chain ratio to the conversion of butadiene was checked. In Example 7, after 30 mol of butadiene monomer were additionally added, the copolymerization reaction was effected. The result is shown in the following table.

| Example No. | Catalyst concentration (mmol/l.) | Toluene (kg.) | Butadiene (mol) | Condition of polymerization of butadiene | Conversion of butadiene (percent) | Additional butadiene (mol) | Styrene (mol) | Condition of polymerization of styrene (° C.) | Condition of polymerization of styrene (hr.) | Styrene content (percent) | Graft efficiency (percent) | Long chain ratio (percent) | $[\eta]$ |
|---|---|---|---|---|---|---|---|---|---|---|---|---|---|
| 4 | 3.9 | 40.12 | 185.4 | After 4 hrs. at 40° C., 1.5 hrs. at 80° C. | 100 | | 123.6 | 130 | 3.5 | 15.0 | 87.3 | 96.9 | 2.64 |
| 5 | 4.1 | 40.12 | 185.4 | After 3 hrs. at 40° C., 0.83 hr. at 80° C. | 96.1 | | 123.6 | 130 | 3.0 | 14.7 | 78.3 | 61.0 | 2.16 |
| 6 | 6.0 | 39.88 | 185.4 | 3 hrs. at 40° C. | 87.45 | | 185.4 | 140 | 3.0 | 29.1 | 94.8 | 52.5 | 1.80 |
| 7 | 6.0 | 32.44 | 150 | 2.5 hrs. at 40° C. | 87.45 | 30 | 150 | 130 | 6 | 21.9 | 99.5 | 5.4 | 2.52 |

As seen from the above table, the amount of butadiene monomer remained has high relation (depending upon the conversion of butadiene) to the long chain ratio.

EXAMPLE 8

In a 300 ml. pressure bottle were charged 31.1 ml. of toluene under nitrogen atmosphere, and added 0.127 mmol of nickel naphthenate, 0.425 mmol of boron trifluoride etherate and 0.425 mmol of triethylaluminum to prepare a catalyst in the same manner as described in Example 1. Then 0.125 mol of butadiene was added to the catalyst system and the polymerization was effected at 40° C. for 4 hours, after which 0.5 mol of styrene was added thereto, stirred thoroughly and the copolymerization reaction was effected at 140° C. for 16 hours.

The reaction product was poured into a large amount of 1% phenyl-β-naphthylamine solution in methanol to precipitate the resulting copolymer, which was recovered and dried under vacuum to obtain 57.1 g. (yield: 97.0%) of white resinous copolymer. The result of infrared analysis showed a styrene content of 88.2%. The intrinsic viscosity was 0.64, the graft efficiency was 99.8% and the long chain ratio was 100%.

EXAMPLE 9

A catalyst was prepared in a 25 lit. autoclave which had been charged with 9.9 lit. of anhydrous toluene, using 15.90 mmol of nickel naphthenate, 31.71 mmol of boron trifluoride etherate and 31.71 mmol of triethylaluminum in the similar manner as described in Example 1.

The polymerization for first stage was carried out with 40 mol of butadiene at 40° C. for 3.25 hours and then, 60 mol of styrene were added to the system and kept at 80° C. for 42 hours under successive stirring.

The product was 1.72 kg. of rubbery solid and had an intrinsic viscosity of 2.38. By infrared analysis, the polymer contained 14.4% styrene (based on total polymer) and 92.1% cis-1,4-; 6.0% trans-1,4-; 1.9% vinyl structures (based on the butadiene portion of the polymer).

The result of fractional extraction using n-hexane and N,N'-dimethylformamide showed that 99.3% of styrene unit in the polymer graft-copolymerized with butadiene unit.

What is claimed is:

1. A process for manufacturing cis-1,4 butadiene graft-copolymers having a cis-1,4 content of at least 85% and substantially no gel, which comprises substantially completely polymerizing butadiene with a catalyst at a temperature within the range of −30° C. to 150° C. and graft copolymerizing onto the thus formed polybutadiene with a graft efficiency of more than 70% a comonomer selected from the group consisting of styrene and α-alkylstyrene at a temperature within the range of 80° C. to 180° C., wherein said process is carried out in the presence of a hydrocarbon diluent containing from 3 to 12 carbon atoms, under sufficient pressure to maintain the reaction system in the liquid phase, and under an inert atmosphere, said catalyst having three components consisting of (A) an organic carboxylic acid salt of nickel of the formula

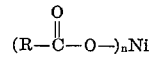

wherein R is a hydrocarbon radical having from 1 to 20 carbon atoms and $n$ is the valence of nickel, (B) a boron trifluoride etherate and (C) a trialkylaluminum, wherein alkyl group contains from 1 to 6 carbon atoms, the total amount of said catalyst being less than 10.0 mole percent of total monomers, the mole ratio of said (A) component to said (C) component being within the range of 0.005 to 4.0 and the mole ratio of said (C) component to said (B) component being within the range of 0.1 to 5.0.

2. A process according to claim 1, wherein said organic carboxylic acid salt of nickel is nickel naphthenate.

3. A process according to claim 1, wherein said boron trifluoride etherate is boron trifluoride ethyl etherate.

4. A process according to claim 1, wherein said trialkylaluminum is triethylaluminum.

5. A process according to claim 1, wherein said cis-1,4 butadiene graft-copolymer is a cis-1,4 butadiene-styrene graft-copolymer.

6. A process for manufacturing cis-1,4 butadiene graft-copolymers having a cis-1,4 content of 90% to 98% and substantially no gel, which comprises substantially completely polymerizing butadiene with a catalyst at a temperature within the range of 0° C. to 100° C., and graft copolymerizing styrene onto the thus formed polybutadiene with a graft efficiency of styrene of 80 to 100% at a temperature within the range of 100° C. to 160° C., wherein said process is carried out in the presence of a hydrocarbon diluent containing from 3 to 12 carbon atoms, under sufficient pressure to maintain the reaction system in the liquid phase, and under an inert atmosphere, said catalyst having three components consisting of (A) an organic carboxylic acid salt of nickel of the formula

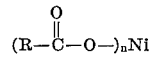

wherein R is a hydrocarbon radical having from 1 to 20 carbon atoms and $n$ is the valence of nickel, (B) a boron trifluoride etherate and (C) a trialkylaluminum, wherein alkyl group contains from 2 to 4 carbon atoms, the total amount of said catalyst being less than 10.0 mole percent of total monomers, the mole ratio of said (A)

component to said (C) component being within the range of 0.01 to 1.0 and the mole ratio of said (C) component to said (B) component being within the range of 0.3 to 2.0.

References Cited

UNITED STATES PATENTS

| | | | |
|---|---|---|---|
| 3,068,180 | 12/1962 | van Amerongen | 260—84.1 |
| 3,170,907 | 2/1965 | Ueda et al. | 260—94.3 |
| 3,215,682 | 11/1965 | Farrar et al. | 260—84.1 |
| 3,228,917 | 1/1966 | Childers | 260—94.3 |
| 3,299,178 | 1/1967 | Short et al. | 260—880 |
| 3,428,699 | 2/1969 | Schleimer et al. | 260—93.5 |

JAMES A. SEIDLECK, Primary Examiner

U.S. Cl. X.R.

252—429; 260—94.3